October 24, 1913.

DRAWING 2,738

A careful search has been made this day for the original drawing or a photolithographic copy of the same, for the purpose of reproducing the said drawing to form a part of this book, but at this time nothing can be found from which a reproduction can be made.

Finis D. Morris,
Chief of Division E.

AWK

UNITED STATES PATENT OFFICE.

UEL WEST, OF NEW YORK, N. Y.

COUPLING CONDUIT-PIPES.

Specification of Letters Patent No. 2,738, dated July 23, 1842.

*To all whom it may concern:*

Be it known that I, UEL WEST, of the city, county, and State of New York, have invented a new and useful improvement in the method of constructing and using an appropriate coupler or connecting instrument, represented on the annexed or accompanying drawings, Figures 1, A and AB and K L, for coupling together the extremities of conduits in such a manner that they may be disconnected and recoupled, as shown at D, Fig. 4, and E, Fig. 5, and Fig. 3, W W, without breaking or disturbing the adjoining conduits D F, whenever it becomes necessary to insert a stop-cock or remove or displace a defective conduit for a better article, which cannot be done by the methods hitherto in use with right-angled joints.

The undersigned distinguishes his said improvement by the term "bevel flange coupler" which consists of two similar parts, as represented at A and AB, Fig. 1, where N, N, constitutes the body, which is a short pipe with a bevel flange V, V, on one extremity, the said pipe projecting about one quarter of an inch beyond the front surface of said flange as shown at O, for the purpose of forming a rest or stop for the usual packing to be inserted in the space T or vacancy left between the said flanges when brought and bolted together as shown at K, L by taper bolts M M, the other extremity of said pipe G, G, corresponding in size and shape, the one with the male end, or extremity of a conduit represented at S, D, the other with the female end, or extremity of a conduit S F.

The manner of applying the said coupler is shown on said drawing Fig. 2 and Fig. 3. The former represents a stop cock B, ready to be inserted in the space H, between conduits D and F; P, the female extremity of the coupler K ready to cover the male extremity S, of conduit D Fig. 4; Q, one of the flanges of coupler K bolted to and thus connected with the other flange of the coupler K attached to the said stop cock B; C, one of the flanges of coupler L on the extremity of the pipe U attached also to the said stop cock B; E, the male end or extremity of the pipe of coupler L ready to be inserted in the female end or extremity of conduit F, Fig. 5. The latter Fig. 3 exhibits a conduit J with a pair of right and left couplers K and L attached to its extremities W, W; X X, the extremities of that part or half of each pair of said couplers (K and L) in connection with the extremities of said conduit J.

$Y^1$ represents the female extremity of pipe X (being one half part of coupler K) ready to cover the male extremity of S, of conduit D, Fig. 4.

$Y^2$ represents the male extremity of pipe X (being one half part of coupler L), ready to be inserted in the female extremity S of conduit F, Fig. 5.

What the undersigned claims as his invention and wishes to secure by Letters Patent, is—

The mode of connecting the joints of conduits, hydrants, &c., by means of beveled flanged joints; in the manner herein described, or in any other essentially the same.

UEL WEST.

Witnesses:
JNO. W. C. LEVERIDGE,
ISAAC ASTEN.